US012366355B1

(12) United States Patent
Fang

(10) Patent No.: US 12,366,355 B1
(45) Date of Patent: Jul. 22, 2025

(54) FAN ASSEMBLY WITH DIGITAL DISPLAY STRUCTURE

(71) Applicant: JIETE TECHNOLOGY CO.,LTD, Qingyuan (CN)

(72) Inventor: Anding Fang, Qingyuan (CN)

(73) Assignee: JIETE TECHNOLOGY CO., LTD, Qingyuan (CN)

( * ) Notice: Subject to any disclaimer, the term of this patent is extended or adjusted under 35 U.S.C. 154(b) by 0 days.

(21) Appl. No.: 18/665,322

(22) Filed: May 15, 2024

(51) Int. Cl.
*F21V 33/00* (2006.01)
*F04D 25/06* (2006.01)
*F04D 29/52* (2006.01)

(52) U.S. Cl.
CPC ........ *F21V 33/0096* (2013.01); *F04D 25/068* (2013.01); *F04D 29/522* (2013.01)

(58) Field of Classification Search
None
See application file for complete search history.

(56) References Cited

U.S. PATENT DOCUMENTS 11,686,467 B1 * 6/2023 Yuan .................... F04D 25/166 362/96

FOREIGN PATENT DOCUMENTS

CN 205401176 U 7/2016
CN 216306291 U * 4/2022

OTHER PUBLICATIONS

Tom's Hardware + DeepCool Merged Document (https://www.tomshardware.com/news/lcd-screens-and-argb-come-to-cpu-air-coolers-with-deepcools-new-lineup; Published Aug. 3, 2023; pp. 1-4; & https://www.deepcool.com/company/pressroom/newsrelease/2023/17391.shtml?id=PressRoom; Published Jul. 18, 2023; pp. 5-9) (Year: 2023).*

* cited by examiner

*Primary Examiner* — Juan G Flores
(74) *Attorney, Agent, or Firm* — JEEN IP LAW, LLC

(57) ABSTRACT

A fan assembly with a digital display structure, including an upper housing and a lower housing, the upper housing is vertically installed on the lower housing; a liquid crystal display (LCD) screen and an LED light strip that are vertically installed on the upper housing and the lower housing, and the LCD screen is electrically connected to the LED light strip; a transmission bearing and a fan body that are vertically installed on the upper housing and the lower housing, the transmission bearing is vertically installed on a bracket, the fan body is vertically installed on the transmission bearing, and the transmission bearing is connected to the fan body to drive the fan body to rotate; a light-transmissive grid, which is located between the upper housing and the lower housing, and the light-transmissive grid is respectively connected to the upper housing and lower housing.

7 Claims, 5 Drawing Sheets

FAN ASSEMBLY WITH DIGITAL DISPLAY STRUCTURE

TECHNICAL FIELD

The present invention relates to the field of the development of computer fan technology, specifically a fan assembly with a digital display structure.

BACKGROUND

Computer fans, also known as heat dissipation fans, are generally used for heat dissipation and used in heat sinks and chassis. On existing fans, however, generally corresponding patterns (such as logos) or texts are hollowed or engraved on transparent boards to provide the display effect that customers need;

The existing Chinese patent with reference publication number CN205401176U discloses a heat dissipation fan, including an upper panel and a lower panel, a connecting body is provided between the upper and lower panels, a through hole is set between the upper and lower panels, fan blades and a motor integrated with fan blades are disposed inside the through hole, the upper panel is provided with a protection net that is fixed to the four corners of the upper panel through fixing rods and screws, the connecting body is provided with breathable holes that enhance the ventilation efficiency of the connecting body, thereby improving the heat dissipation of the fan; the lower board is provided with fixing holes; the protection net includes a plurality of concentric metal rings and fixing rods. The above-mentioned invention patent can effectively prevent foreign objects from entering the interior of the fan and avoid fan stagnation, but cannot detect the fan's internal components and does not facilitate the observation of fan's internal condition. To address the problem, the present inventor proposes a fan assembly with a digital display structure, and the display screen in the above-mentioned technical solution can detect the fan's internal condition, and also provide diversified and dynamic visual effects for the fan's external decoration and improve the practicality.

SUMMARY

In response to the shortcomings in the above-mentioned technology, the present invention provides a fan assembly with a digital display structure.

In order to achieve the above objectives, the present invention adopts the following technical solution:

A fan assembly with a digital display structure, includes a support component, a control component, and a heat dissipation component, the control component is vertically installed on the support component, the control component is connected to the support component for fan controlling, the heat dissipation component is vertically installed on the support component, the heat dissipation component is connected to the support component for fan dissipation, the control component includes an LCD and an LED light strip, the LCD is vertically installed on the support component, the LED light strip is vertically installed on the support component, the LCD is electrically connected to the LED light strip.

In further, the control component includes a first electrical connection portion and a second electrical connection portion, the first electrical connection portion is vertically installed on the support component, and the second electrical connection portion is vertically installed on the support component and far away from the first electrical connection portion.

In further, the support component includes an upper housing and a lower housing, the upper housing is vertically installed on the lower housing, the lower housing is vertically installed on the upper housing, the upper housing is connected to the lower housing to support the heat dissipation component and control component, the LCD is disposed between the upper housing and the lower housing, the LED light strip is disposed inside the lower housing, and the first electrical connection portion and second electrical connection portion are located on the two side walls of the upper housing and lower housing, respectively.

In further, a bracket supporting the heat dissipation component is provided inside the lower housing, the bracket is vertically installed on the lower housing, and the bracket is connected to the lower housing.

In further, the heat dissipation component includes a transmission bearing and a fan body, the transmission bearing is vertically installed on the bracket, the fan body is vertically installed on the transmission bearing, and the transmission bearing is connected to the fan body to drive fan body to rotate.

In further, the fan body extends outward and is provided with fan blades, fan blades are vertically installed on the fan body, and the fan body is connected to the fan blades.

In further, a fixed component is provided inside the support component, the fixed component includes a through hole and a limit hole, the through hole is vertically provided on the upper housing, the limit hole is vertically provided on the lower housing, and the limit hole is connected to the through hole.

In further, the support component extends outward and is provided with a connecting component, and the connecting component is internally provided with a step groove, the step groove is vertically installed on the upper housing and the lower housing, the connecting component is internally provided with a buckle, and the buckle is vertically installed on the upper housing and the lower housing and is far away from the step groove.

In further, the support component is internally provided with a light-transmissive grid, which is located between the upper housing and the lower housing, and the light-transmissive grid is respectively connected to the upper housing and lower housing.

In conclusion, the present invention has the following beneficial effects: in the fan assembly with a digital display structure, the LCD allows users view the operation status of the fan in real-time, including key information such as speed and temperature, so that users can understand the working condition of the fan, detect potential problems in time and carry out timely maintenance, thus ensuring the fan's stable operation and improving its practicality.

In the figure: 1—Light transmissive grid, 101—LCD, 102—LED light strip, 103—First electrical connection portion, 104—Second electrical connection portion, 201—Upper housing, 202—Lower housing, 203—Bracket, 301—Transmission bearing, 302—Fan body, 303—Fan blade, 401—Through hole, 402—Limit hole, 501—Step groove, 502—Buckle.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

Figure 1:
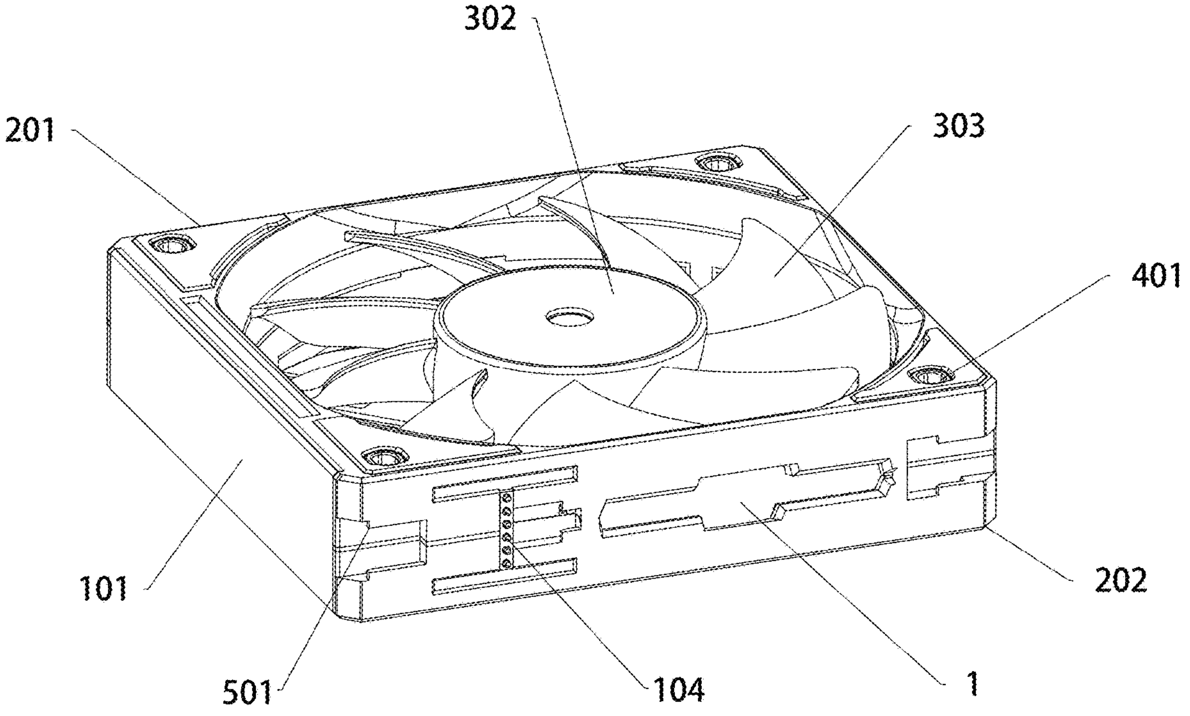
FIG. 1 is a three-dimensional structure diagram of a fan assembly with a digital display structure of the present invention.
Figure 2:
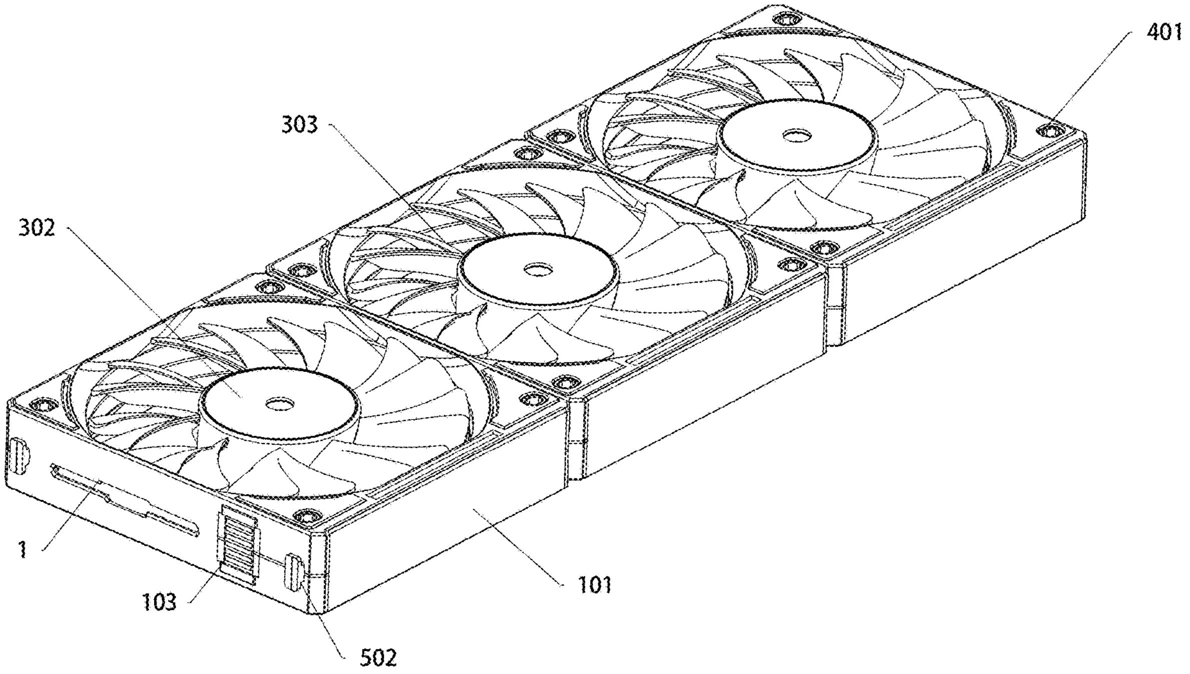
FIG. 2 is a three-dimensional structure diagram of a fan assembly with a digital display structure of the present invention.
Figure 3:
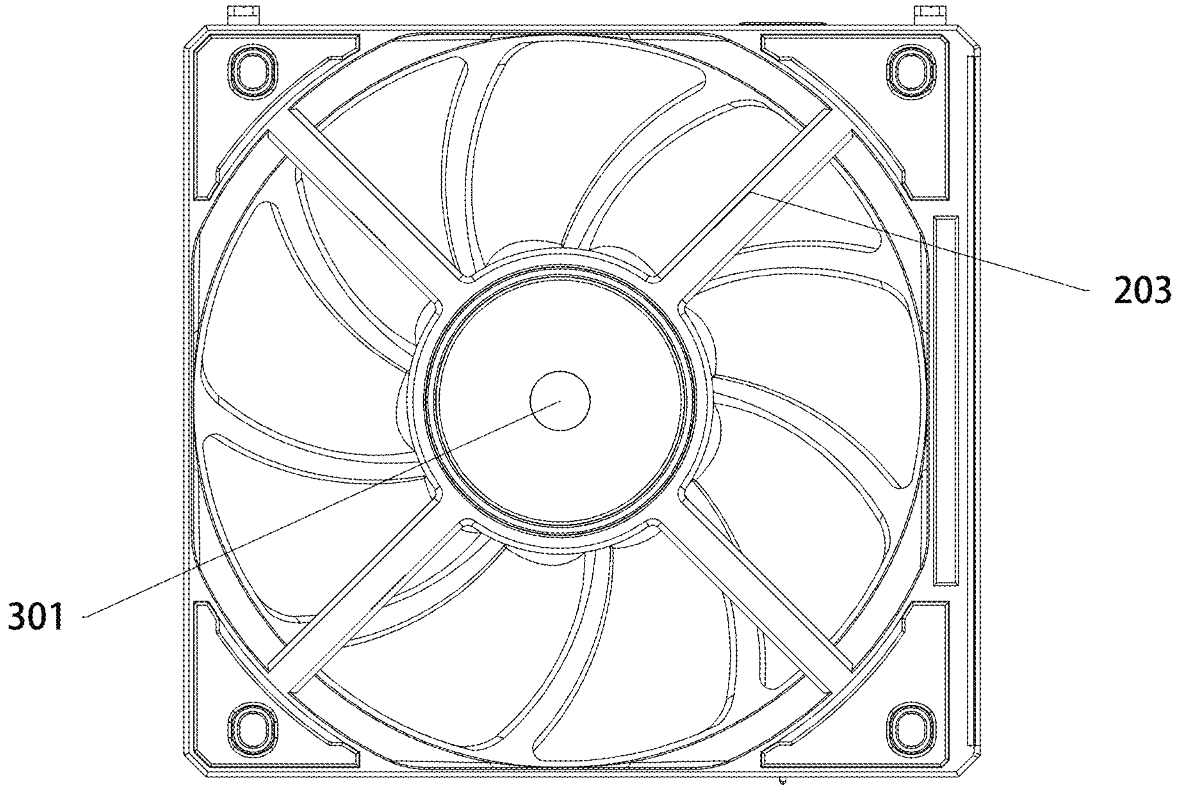
FIG. 3 is a structure diagram of a fan assembly with a digital display structure of the present invention.
Figure 4:
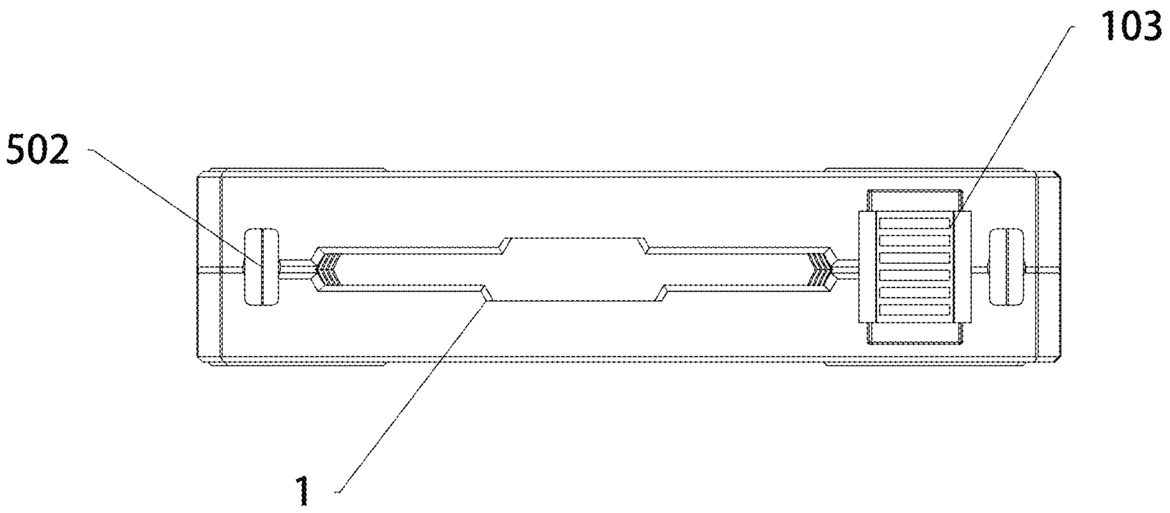
FIG. 4 is a left view of a fan assembly with a digital display structure of the present invention.
Figure 5:
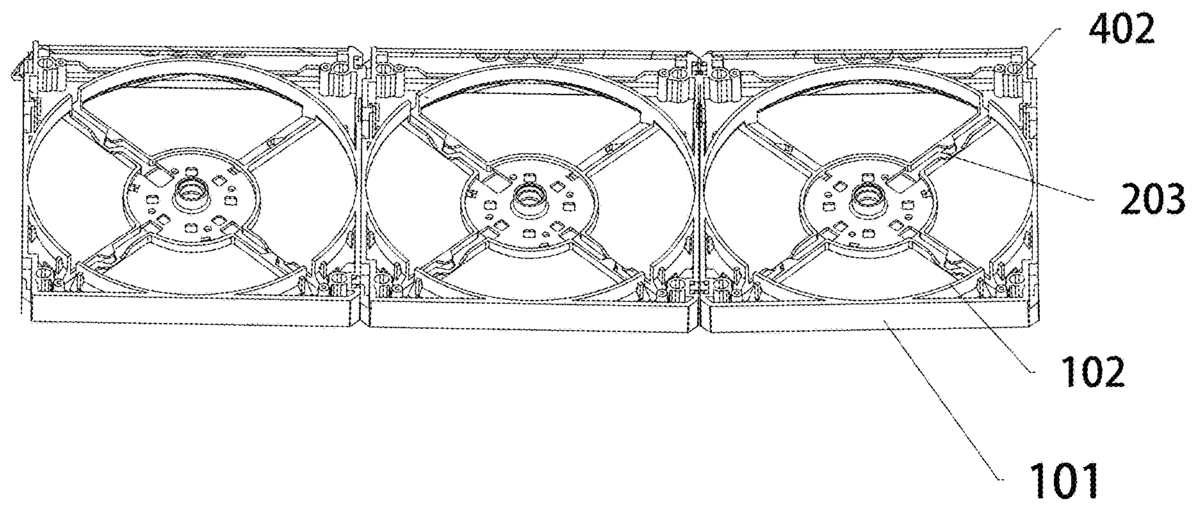
FIG. 5 is a sectional view of a fan assembly with a digital display structure of the present invention.

As shown in FIG. 1-5, a fan assembly with a digital display structure includes a support component, a control component, and a heat dissipation component, the control component is vertically installed on the support component, the control component is connected to the support component for fan controlling, the heat dissipation component is vertically installed on the support component, the heat dissipation component is connected to the support component for fan dissipation, the control component includes an LCD 101 and an LED light strip 102, the LCD 101 is vertically installed on the support component, the LED light strip 102 is vertically installed on the support component, the LCD 101 is electrically connected to the LED light strip 102, the control component includes a first electrical connection portion 103 and a second electrical connection portion 104, the first electrical connection portion 103 is vertically installed on the support component, and the second electrical connection portion 104 is vertically installed on the support component and far away from the first electrical connection portion 103.

Specifically, the deployment of LCD 101 enables setting patterns or text on the fan according to the needs of customers or users, such as logo, fan speed, specific temperature of the environment, improving the practicality of fan detection; in addition, the first electrical connection portion 103 and the second electrical connection portion are connected through LCD 101, which can reduce the use of cables, facilitate fan assembling and improve fan stability, the LED strip 102, as an auxiliary lighting and decoration element, will light up as the fan starts, the LED strip 102 is connected to the LCD 101 through electrical connections, and different colors and flashing modes can be set as needed, adding a dynamic visual effect to the appearance of the fan.

The support component includes an upper housing 201 and a lower housing 202, the upper housing 201 is vertically installed on the lower housing 202, the lower housing 202 is vertically installed on the upper housing 201, the upper housing 201 is connected to the lower housing 202 to support the heat dissipation component and control component, the LCD 101 is disposed between the upper housing 201 and the lower housing 202, the LED light strip 102 is disposed inside the lower housing 202, and the first electrical connection portion 103 and second electrical connection portion 104 are located on the two side walls of the upper housing 201 and lower housing 202, respectively.

Specifically, the connection structure between the upper housing 201 and the lower housing 202 not only provides stable support, but also ensures accurate positioning of internal components, improving the stability of the fan body 302.

The interior of lower housing 202 is provided with a bracket 203 for supporting the heat dissipation component, the bracket 203 is vertically installed on the lower housing 202 and is connected to the lower housing 202, the heat dissipation component includes a transmission bearing 301 and a fan body 302, the transmission bearing 301 is vertically installed on the bracket 203, the fan body 302 is vertically installed on the transmission bearing 301, and the transmission bearing 301 is connected to the fan body 302 to drive fan body 302 to rotate, the fan body 302 extends outward and is provided with fan blades 303, fan blades 303 are vertically installed on the fan body 302, and the fan body 302 is connected to the fan blades 303.

Specifically, the heat dissipation component plays a crucial role during fan operation. The transmission bearing 301 is connected to the fan body 302 and a motor (not shown in the figure) drives the fan body 302 to rotate. The fan blades 303 on the fan body 302 rotate accordingly to generate airflow to dissipate heat inside and around the fan. The bracket 203 inside the lower housing 202 provides stable support for the heat dissipation component, ensuring the stable operation of fan body 302 and transmission bearing 301.

A fixed component is provided inside the support component, the fixed component includes a through hole 401 and a limit hole 402, the through hole 401 is vertically provided on the upper housing 201, the limit hole 402 is vertically provided on the lower housing 202, and the limit hole 402 is connected to the through hole 401.

Specifically, the through hole 401 and limit hole 402 in the fixed component are fixed to the upper housing 201 and lower housing 202 by screws (not shown in the figure) to prevent displacement or shaking during use, thereby improving the stability of upper housing 201 and lower housing 202.

The support component extends outward and is provided with a connecting component, and the connecting component is internally provided with a step groove 501, the step groove 501 is vertically installed on the upper housing 201 and the lower housing 202, the connecting component is internally provided with a buckle 502, and the buckle 502 is vertically installed on the upper housing 201 and the lower housing 202 and is far away from the step groove 501.

Specifically, the step groove 501 is mainly used for the mutual cooperation between the first electrical connection portion 103 and the second connection portion, and when the step groove 501 matches the first electrical connection portion 103 and the second connection portion, the buckle 502 deployed will further fix the upper housing 201 and the lower housing 202, improving the practicality.

The support component is internally provided with a light-transmissive grid 1, which is located between the upper housing 201 and the lower housing 202, and the light-transmissive grid 1 is respectively connected to the upper housing 201 and lower housing 202.

Specifically, light-transmissive grid 1 increases ventilation and improves overall aesthetics, it is located between is connected to the upper housing 201 and the lower housing 202, allowing airflow to pass through and enhancing heat dissipation. In further, the designed light-transmissive grid 1 also allows the light of LED light strip 102 to pass through to form a unique lighting effect, improving the overall texture of the fan assembly and its practicality.

For person skilled in the art, obviously, the present invention is not limited to the details of the exemplary embodiments mentioned above, and can be implemented in other specific forms without departing from the spirit or basic features of the present invention. Therefore, from any perspective, the embodiments shall be regarded as exemplary and non restrictive, and the scope of the present invention is limited by the accompanying claims rather than the above description and, therefore, is intended to encompass all variations that fall within the meaning and scope of equivalent elements of the claims within the present invention. No accompanying drawings in the claims shall be regarded as limiting the claims involved.

In addition, it shall be understood that although the specification is described according to the implementation modes, not each implementation mode only includes an independent technical solution. This description in the specification is for clarity only. Those skilled in the art shall regard the specification as a whole, and the technical solutions in each implementation mode can be appropriately combined to form other implementation modes that those skilled in the art can understand.

What is claimed is:

1. A fan assembly with a digital display structure, including an upper housing and a lower housing, the upper housing is vertically installed on the lower housing; a liquid crystal display (LCD) screen and an LED light strip that are vertically installed on the upper housing and the lower housing, and the LCD screen is electrically connected to the LED light strip; a transmission bearing and a fan body that are vertically installed on the upper housing and the lower housing, the transmission bearing is vertically installed on a bracket, the fan body is vertically installed on the transmission bearing, and the transmission bearing is connected to the fan body to drive the fan body to rotate; a light-transmissive grid, which is located between the upper housing and the lower housing, and the light-transmissive grid is respectively connected to the upper housing and lower housing.

2. The fan assembly with a digital display structure according to claim 1, further including a first electrical connection portion and a second electrical connection portion that are vertically installed on the upper housing and the lower housing.

3. The fan assembly with a digital display structure according to claim 2, wherein the lower housing is vertically installed on the upper housing, the upper housing is connected to the lower housing to support the LCD screen, the LED light strip, the transmission bearing and the fan body; the LCD screen is disposed between the upper housing and the lower housing, the LED light strip is disposed inside the lower housing, and the first electrical connection portion and the second electrical connection portion are located on different side walls of the upper housing and lower housing, respectively.

4. The fan assembly with a digital display structure according to claim 3, wherein the bracket supporting the transmission bearing and the fan body is provided inside the lower housing, the bracket is vertically installed on the lower housing, and the bracket is connected to the lower housing.

5. The fan assembly with a digital display structure according to claim 4, wherein the fan body extends outward and is provided with fan blades, the fan blades are vertically installed on the fan body, and the fan body is connected to the fan blades.

6. The fan assembly with a digital display structure according to claim 3, further including a through hole and a limit hole, the through hole is vertically provided on the upper housing, the limit hole is vertically provided on the lower housing, and the limit hole is connected to the through hole.

7. The fan assembly with a digital display structure according to claim 3, further including a step groove and a buckle, the step groove is vertically installed on the upper housing and the lower housing, and the buckle is vertically installed on the upper housing and the lower housing.

* * * * *